United States Patent
Liu

(10) Patent No.: US 9,846,984 B2
(45) Date of Patent: Dec. 19, 2017

(54) DEVICE FOR RECOGNIZING IMAGE AND DEVICE FOR READING IMAGE

(71) Applicant: WEIHAI HUALING OPTO-ELECTRONICS CO., LTD., Shandong (CN)

(72) Inventor: Zhenxiang Liu, Shandong (CN)

(73) Assignee: WEIHAI HUALING OPTO-ELECTRONICS CO., LTD., Shandong (CN)

( * ) Notice: Subject to any disclaimer, the term of this patent is extended or adjusted under 35 U.S.C. 154(b) by 128 days.

(21) Appl. No.: 14/651,036

(22) PCT Filed: Nov. 6, 2013

(86) PCT No.: PCT/CN2013/086635
§ 371 (c)(1),
(2) Date: Jun. 10, 2015

(87) PCT Pub. No.: WO2014/090056
PCT Pub. Date: Jun. 19, 2014

(65) Prior Publication Data
US 2015/0317857 A1   Nov. 5, 2015

(30) Foreign Application Priority Data
Dec. 10, 2012 (CN) .......................... 2012 1 0529054

(51) Int. Cl.
*G06K 9/00* (2006.01)
*G07D 7/20* (2016.01)
(Continued)

(52) U.S. Cl.
CPC .................. *G07D 7/20* (2013.01); *G07D 7/02* (2013.01); *G07D 7/12* (2013.01);
(Continued)

(58) Field of Classification Search
None
See application file for complete search history.

(56) References Cited

U.S. PATENT DOCUMENTS

| 7,978,259 B2 | 7/2011 | Matsuo et al. |
| 8,245,877 B2 * | 8/2012 | Ophardt ............... A47K 5/1217 222/1 |

(Continued)

FOREIGN PATENT DOCUMENTS

| CN | 101030245 A | 9/2007 |
| CN | 101860645 A | 10/2010 |

(Continued)

OTHER PUBLICATIONS

International Search Report for International Application No. PCT/CN2013/086635, dated Feb. 20, 2014 (4 pages).
(Continued)

*Primary Examiner* — Nancy Bitar
(74) *Attorney, Agent, or Firm* — Clark & Elbing LLP

(57) ABSTRACT

The disclosure provides a device for recognizing an image and a device for reading an image. The device for recognizing the image includes a circuit board (50) on which a plurality of light sources (20) are arranged, the multiple light sources (20) which are configured to supply multiple lights in different directions to the image to be recognized, and an imaging component configured to uniformly image the lights diffused by the image to be recognized so as to recognize the image to be recognized. The disclosure solves the problem that the device for recognizing the image in the relevant technology may only supply one single light emitting direction, and the device for recognizing the image has a beneficial effect of recognizing a hologram including various pieces of image information.

9 Claims, 4 Drawing Sheets

(51) Int. Cl.
*G07D 7/12* (2016.01)
*G07D 7/02* (2016.01)
*H04N 1/00* (2006.01)
*H04N 1/028* (2006.01)

(52) U.S. Cl.
CPC ......... *H04N 1/00798* (2013.01); *H04N 1/028* (2013.01); *H04N 1/0281* (2013.01); *H04N 1/0284* (2013.01); *G07D 2207/00* (2013.01); *H04N 2201/0081* (2013.01)

(56) References Cited

U.S. PATENT DOCUMENTS

| | | | |
|---|---|---|---|
| 9,336,427 B2* | 5/2016 | Aoki | G06K 9/00046 |
| 2007/0037290 A1* | 2/2007 | Hoshino | B42D 25/391 |
| | | | 436/170 |
| 2007/0206098 A1* | 9/2007 | Matsuo | G06K 9/00033 |
| | | | 348/207.99 |
| 2011/0261420 A1 | 10/2011 | Iwayama | |

FOREIGN PATENT DOCUMENTS

| | | |
|---|---|---|
| CN | 101986352 A | 3/2011 |
| CN | 102006391 A | 4/2011 |
| CN | 102014234 A | 4/2011 |
| CN | 102801890 A | 11/2012 |
| CN | 103002192 A | 3/2013 |
| CN | 202998259 U | 6/2013 |
| EP | 1830305 A1 | 9/2007 |

OTHER PUBLICATIONS

Extended European Search Report for European Patent Application No. 13862434.1, dated Oct. 16, 2017 (7 pages).
Search Report for Chinese Application No. 2012105290548, dated Mar. 9, 2017 (1 page).

* cited by examiner

DEVICE FOR RECOGNIZING IMAGE AND DEVICE FOR READING IMAGE

TECHNICAL FIELD

The disclosure relates to the field of image recognition, in particular to a device for recognizing an image and a device for reading an image.

BACKGROUND

FIG. 1 is a section view of a contact type image sensor according to the relevant technology. As show in FIG. 1, the structure of the contact type image sensor used for reading image by the relevant devices, such as multifunctional all-in-one machine, special scanner and fax machine is as follow: a glass plate 3 is arranged on a framework 1; a circuit board 5 is arranged below the framework 1; a set of photoelectric conversion chips 6 are arranged on the circuit board 5; a set of linear array lenses 4 are arranged on the photoelectric conversion chips 6; a light source 2 is arranged on one side of each linear array lens 4. Each light source of the contact type image sensor emits light on one side of the corresponding linear array lens, and the light sources only supply one light emitting direction.

With the expansion of the application field, more and more requirements are made on the functions of image sensor. For example, a paper money counterfeit detection machine of a bank system needs to recognize multiple pieces of anti-counterfeit information on paper money, wherein hologram information needs to recognize different pieces of image information at different angles or directions. Generally three different images may be observed on holograms on the current paper money in the world at different angles or directions.

For the problem that the device for recognizing the image in relevant technology may only supply one single light emitting direction, no effective solution is provided at present.

SUMMARY

An embodiment of the disclosure provides a device for recognizing an image and a device for reading an image, so as to at least solve the above problem.

The device for recognizing the image is provided according to one aspect of the embodiment of the disclosure, which includes a circuit board configured to arrange the multiple light sources, multiple light sources configured to supply multiple lights in different directions to an image to be recognized, and an imaging component configured to uniformly image lights diffused by the image to be recognized so as to recognize the image to be recognized.

Preferably, the multiple light sources are circumferentially mounted on the circuit board.

Preferably, at least three light sources are provided and are at least provided with three light emitting directions.

Preferably, the multiple light sources are independently controlled to emit the lights or are combined to perform combined light emission.

Preferably, the multiple light sources are combined to perform the combined light emission, and every two of the multiple light sources or every three of the multiple light sources are combined to perform the combined light emission.

Preferably, the imaging component includes a lens and a photoelectric conversion chip, wherein the lens is configured to uniformly image the lights, from the multiple light sources and diffused by the image to be recognized, and project the image to the photoelectric conversion chip, and the photoelectric conversion chip is configured to perform photoelectric conversion on the received lights to generate electric signals so as to generate another image, wherein the generated image is configured to recognize the image to be recognized. Preferably, the lens is circular lens, and its image distance is smaller than the threshold value.

Preferably, the lens is columnar linear array lens, and its image distance is smaller than the threshold value.

Preferably, the device further includes a supporting device arranged on the circuit board and configured to support the lens and enable the lens to be suspended above the photoelectric conversion chip, wherein the photoelectric conversion chip is arranged on the circuit board. By use of the circular lens, the multiple light sources surround the supporting device and are circumferentially mounted on the circuit board. By use of the columnar linear array lenses, the multiple light sources surround the supporting device and are linearly mounted on two sides of the lenses on the circuit board.

Preferably, the device further includes a transparent plate, wherein a funnel-shaped sealing space is formed between the transparent plate and the supporting device as well as the lens, so that the image to be recognized placed on the transparent plate may diffuse the light rays from the multiple light sources onto the lenses.

The device for reading the image is provided according to the other aspect of the embodiment of the disclosure, which includes the above device for recognizing the image, wherein the device for reading the image is configured to generate another image according to the signals output by the device for recognizing the image so as to recognize the image to be recognized.

According to the embodiments of the disclosure, the device for recognizing the image includes the multiple light sources and the imaging component, wherein the circuit board is configured to arrange the multiple light sources, the multiple light sources are configured to supply the multiple lights in different directions to the image to be recognized, and the imaging component is configured to uniformly image the lights diffused by the image to be recognized so as to recognize the image to be recognized. The problem that the light sources in the device for recognizing the image in the relevant technology may only supply one single light emitting direction is solved, and an effect of recognizing the holograms including the multiple pieces of image information may be achieved.

BRIEF DESCRIPTION OF THE DRAWINGS

The drawings here are aimed to supply a further understanding of the disclosure, and constitute a part of the disclosure. The schematic embodiment and the specification of the disclosure are aimed to explain the disclosure, but not constitute an improper limitation to the disclosure. In the drawings.

DETAILED DESCRIPTION OF THE EMBODIMENTS

The disclosure is instructed in detail in the following article on the basis of the reference drawings and the embodiments. It is important to note that under a condition of no conflict, the embodiments of the disclosure and characteristics in the embodiments may be combined with each other.

Embodiment I

Figure 1:
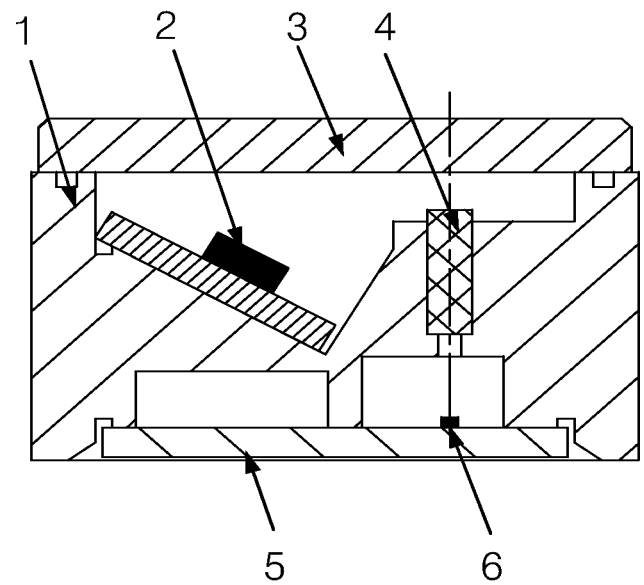
FIG. 1 is a section view of a contact type image sensor according to the relevant technology.
Figure 2:
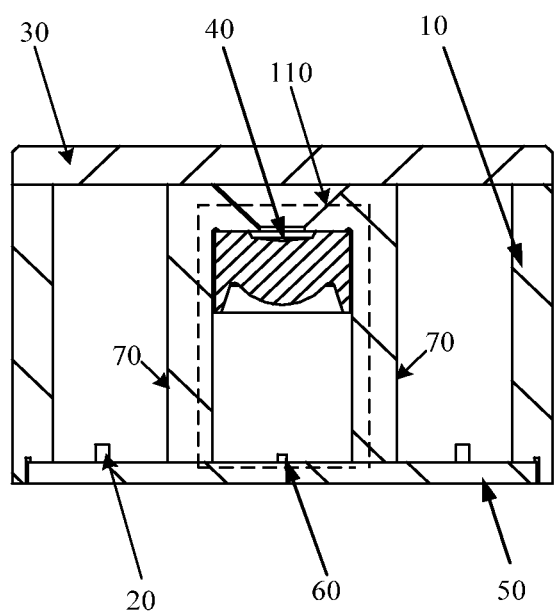
FIG. 2 is a section view of a device for recognizing an image according to an embodiment of the disclosure.

One embodiment of the disclosure provides a device for recognizing an image. FIG. 2 is a structure diagram of a device for recognizing an image according to an embodiment of the disclosure. As show in FIG. 2, the device includes a circuit board 50, a multiple light sources 20 and an imaging component 100.

The circuit board 50 is configured to arrange the multiple light sources 20, the multiple light sources 20 are configured to supply the multiple lights in different directions to emit the image to be recognized, and the imaging component 110 is configured to uniformly image the lights diffused by the image to be recognized so as to recognize the image to be recognized.

Through the above structure, the way that only one single light source is supplied in the relevant technology is changed, and the problem that different image information may be recognized at different angles or directions in the relevant technology is solved, so that the effect of recognizing the multiple pieces of the image information on the hologram is achieved by supplying multiple light emitting directions.

The multiple light sources 20 may be mounted on the circuit board 50 in multiple manners, such as an array mode, and preferably, the multiple light sources 20 may be circumferentially mounted on the circuit boards 50. The multiple light sources 20 are circumferentially arranged, so that light sources in different directions may be conveniently irradiated to the image to be recognized, and the lights diffused by the image to be recognized are imaged uniformly.

More than two light sources 20 may be provided, but preferably, at least three light sources 20 are provided, and the multiple light sources 20 are at least provided with three light emitting directions.

The multiple light sources 20 have multiple light emitting modes, and preferably, the following two modes are included: 1, the multiple light sources 20 are independently controlled to emit light, and 2, the multiple light sources 20 are combined to perform combined light emission. Due to the light emitting modes, the light emission of the multiple light sources 20 may be more flexibly controlled wherein multiple combined light emission modes of the multiple light sources are realized, and preferably, every two or three of the multiple light sources are combined to perform the combined light emission.

The imaging component 110 may include a lens 40 and a photoelectric conversion chip 60, wherein the lens 40 is configured to uniformly image the lights, from the multiple light sources 20 and diffused by the image to be recognized, and project the image to the photoelectric conversion chip 60, the photoelectric conversion chip 60 is configured to perform photoelectric conversion on the received lights to generate electric signals so as to generate an image, wherein the generated image is configured to recognize the image to be recognized.

The lens 40 may have various shapes, and its image distance is diverse; preferably, the lens 40 may be circular lens, and its image distance is smaller than the threshold value. Therefore, the light signals from different directions may be uniformly imaged to surfaces of the photoelectric conversion chip 60.

Preferably, the lens 40 may also be columnar array lens.

The device for recognizing the image further includes a supporting device 70 arranged on the circuit board 50, which is configured to support the lens 40 and enable the lens 40 to be suspended above the photoelectric conversion chip 60, wherein the photoelectric conversion chip 60 is arranged on the circuit board 50. Through the above structure, the lights diffused by the image to be recognized and from the multiple light sources 20 may be more flexibly diffused to the lens to further enable the lens 40 to uniformly form the image.

The multiple light sources 20 are circumferentially arranged on the circuit board 50 in a manner of surrounding the supporting device 70.

The device for recognizing the image further includes a transparent plate 30, wherein a funnel-shaped sealing space is formed between the transparent plate 30 and the supporting device 70 as well as the lens 40, so that the image to be recognized placed on the transparent plate 30 may diffuse the light from the multiple light sources 20 to the lens 40.

The device for recognizing the image may be the contact type image sensor.

Embodiment II

Figure 3:
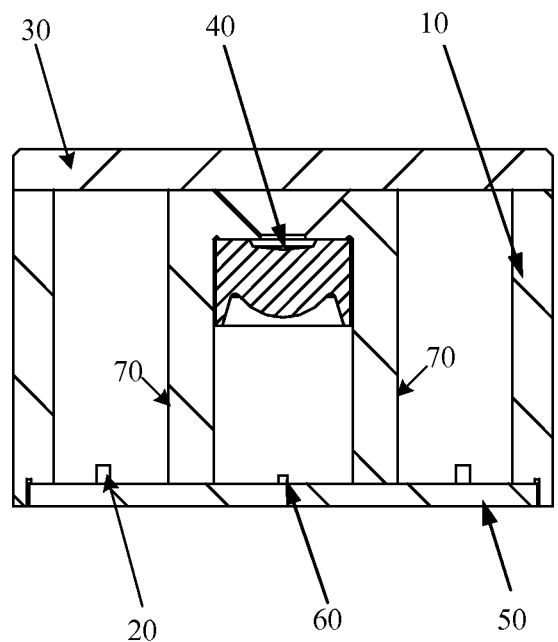
FIG. 3 is a section view of a device for recognizing an image according to a preferred embodiment of the disclosure.
Figure 7:
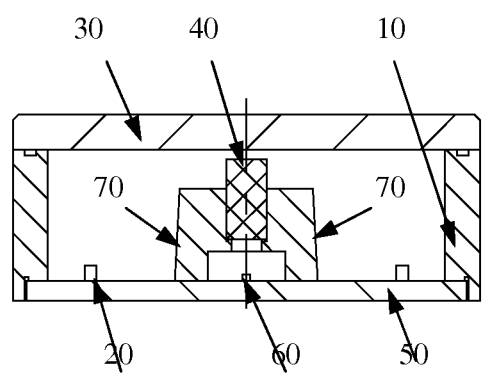
FIG. 7 is a second section view of a device for recognizing an image according to an embodiment of the disclosure.

FIG. 3 is a section view of a device for recognizing an image according to a preferred embodiment of the disclosure. As shown in FIG. 3 and FIG. 7, the device for recognizing the image includes a framework 10, multiple light sources 20, a glass plate 30, a lens 40, a circuit board 50, a photoelectric conversion chip 60 and a supporting device 70. The structures and the functions of all the components are the same as those in the prior art, thus unnecessary details are not needed.

A body of the device for recognizing the image is a cube constructed by the framework 10; its base plate consists of the circuit board 50; the photoelectric conversion chip 60 is arranged on the circuit board 50; the supporting device 70 is arranged at the center position of the circuit board and is configured to support the lens 40, so that the lens 40 is suspended above the photoelectric conversion chip 60. The multiple light sources 20 are circumferentially arranged on the circuit board 50 in a manner of surrounding the supporting device 70. A surface, opposite to the circuit board 50, of the body is provided with the transparent plate 30, wherein the transparent plate 30 is the glass plate. The funnel-shaped sealing space is formed between the transparent plate 30 and the supporting device 70 as well as the lens 40, so that the image to be recognized placed on the transparent plate 30 may diffuse the light rays from the multiple light sources 20 in different directions to the lens 40. The lens 40 is the columnar array lens or the circular macro lens and may uniformly image the light signals from different directions to the surfaces of the photoelectric conversion chip 60, wherein if the lens 40 is columnar array lens, it may generally recognize the image at a near distance (0-4 mm), and if the lens 40 is circular macro lens similar to a mobile phone camera, it may generally recognize the image within a range of 0-50 mm.

Figure 4:
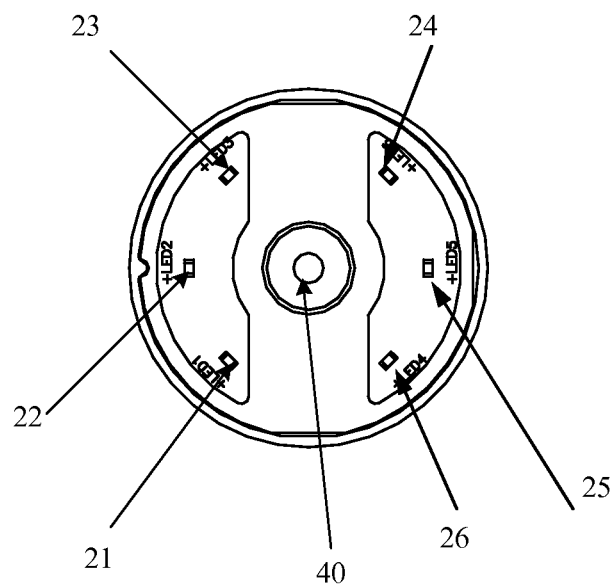
FIG. 4 is a top view of light sources and a lens of a device for recognizing an image according to an embodiment of the disclosure.
Figure 8:
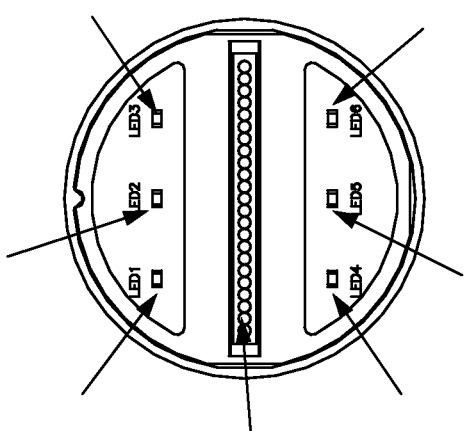
FIG. 8 is a second top view of light sources and a lens of a device for recognizing an image according to an embodiment of the disclosure.

FIG. 4 is a top view of light sources and a lens of a device for recognizing an image according to an embodiment of the disclosure. As shown in FIG. 4 and FIG. 8, six light sources 20, which are a light source 21, a light source 22, a light source 23, a light source 24, a light source 25 and a light source 26, are arranged on the circuit board 50 and are circumferentially arranged. If the six light sources emits light in sequence, six different light emission directions may be supplied; if every two or three of the six light sources 20 are combined, the combined light emission may be implemented according to different forms. Therefore, various different light emission directions may be supplied according to a requirement on an image recognition angle of the hologram.

Embodiment III

One embodiment of the disclosure provides a device for reading an image. The device for reading the image includes a device, provided in the embodiment II, for recognizing the image, wherein the device for reading the image is configured to generate another image according to the signals output by the device for recognizing the image so as to recognize the image to be recognized.

Figure 5:
FIG. 5 is a hologram of an image to be recognized according to an embodiment of the disclosure.
Figure 6:
FIG. 6 is a multi-image information diagram read from a hologram according to an embodiment of the disclosure.

As shown in FIG. 3 and FIG. 8, when working, the image to be recognized is placed on the transparent plate 30 of the device for recognizing the image, and the multiple light sources 20 are supposed to be arranged as shown in FIG. 4, wherein the light source 21 and the light source 26 are arranged in the same light emission direction, the light source 22 and the light source 25 are arranged in the same light emission direction, and the light source 23 and the light source 24 are arranged in the same light emission direction. The lights emitted by the light sources from 21 to 26 in different directions penetrate through the transparent plate 30 to irradiate the image to be recognized, and the image to be recognized diffuses the lights from the light sources 21 to 26 to the surface of the lens 40 through funnel-shaped space between the lens 40 and the transparent plate 30 as well as the supporting plate 70. The lens 40 is circular macro lens and may uniformly image the lights diffused by the image to be recognized to the photoelectric conversion chip 60. The photoelectric conversion chip 60 performs photoelectric conversion on the lights projected by the lens 40 so as to generate the electric signals, and the electric signals are input into the processing equipment such as the computer for processing, so that various pieces of image information in the image to be recognized are read according to the electric signals. Supposing that the hologram of the image to be recognized is shown in FIG. 5, after the device for reading the image reads the hologram, an image obtained thereby is shown in FIG. 6.

The device for reading the image may be the multifunctional all-in-one machine, the special scanner and the fax machine or the paper money counterfeit detection machine of the bank system.

The above description shows that the embodiments of the disclosure have following technical effects: by providing the light sources with various light emission directions and the circular macro lens, the contact type image sensor with a function of reading various pieces of image information on the hologram is realized, particularly, each light source circumferentially arrayed in the embodiment of the disclosure irradiates the image to be recognized in different directions, so that multi-directional irradiation angles may be supplied, and the circular macro lens may uniformly image the light sources from different directions to the surfaces of the photoelectric conversion chip; therefore, multiple pieces of image information implied in the hologram may be read.

The above are only the preferred embodiments of the disclosure, and are not intended to limit the disclosure. For those skilled in this field, the disclosure may have various modifications and changes. Any modification, equivalent replacement, improvement and the like all executed within the spirits and principles of the disclosure should be included in the scope of protection of the disclosure.

INDUSTRIAL APPLICABILITY

As stated above, the device for recognizing the image and the device for reading the image, provided by the embodiments of the disclosure, have the following beneficial effects that by providing the light sources with various light emission directions and the circular macro lens, the contact type image sensor with a function of reading various pieces of image information on the hologram is realized, particularly, each light source circumferentially arrayed in the embodiment of the disclosure irradiates the image to be recognized in different directions, so that multi-directional irradiation angles may be supplied, and the circular macro lens may uniformly image the light sources from different directions to the surfaces of the photoelectric conversion chip; therefore, multiple pieces of image information implied in the hologram may be read.

What is claimed is:
1. A device for recognizing an image, comprising:
a circuit board (50) configured to arrange multiple light sources (20);
the multiple light sources (20) configured to supply various lights in different directions to an image to be recognized;
an imaging component configured to uniformly image lights diffused by the image to be recognized to recognize the image to be recognized;
wherein the imaging component comprises:
a lens (40) configured to uniformly image the lights, from the multiple light sources (20) and diffused by the image to be recognized, and project the lights imaged to a photoelectric conversion chip (60);
the photoelectric conversion chip (60), configured to perform photoelectric conversion on the received lights to generate electric signals so as to generate an image, wherein the generated image is used for recognizing the image to be recognized;
the device further comprises:
a supporting device (70) arranged on the circuit board (50) and configured to support the lens (40) to enable the lens (40) to be suspended above the photoelectric conversion chip (60), wherein the photoelectric conversion chip (60) is arranged on the circuit board (50);
the multiple light sources (20) are circumferentially arranged on the circuit board (50) in a manner of surrounding the supporting device (70); and a transparent plate (30), wherein a funnel-shaped sealing space is formed between the transparent plate (30) and the supporting device (70) and the lens (40) to enable the image to be recognized placed on the transparent plate (30) to diffuse lights from the multiple light sources (20) to the lens (40).

2. The device according to claim 1, wherein the multiple light sources (20) are circumferentially arranged on the circuit board (50).

3. The device according to claim 2, wherein the number of the multiple light sources (20) is equal to or greater than three and the multiple light sources (20) are at least provided with three light emission directions.

4. The device according to claim 3, wherein the multiple light sources (20) are independently controlled to emit the light or are combined to perform combined light emission.

5. The device according to claim 4, wherein the multiple light sources (20) being combined to perform the combined light emission comprises:

every two or three of the multiple light sources (20) are combined to perform the combined light emission.

6. The device according to claim 1, wherein the lens (40) is a circular lens, and image distance of the lens (40) is smaller than a threshold value.

7. A device for reading an image, comprising the device for recognizing the image according to claim 1, wherein the device for reading the image is configured to generate an image according to the signals output by the device for recognizing the image to recognize the image to be recognized.

8. A device for reading an image, comprising the device for recognizing the image according to claim 2, wherein the device for reading the image is configured to generate an image according to the signals output by the device for recognizing the image to recognize the image to be recognized.

9. A device for reading an image, comprising the device for recognizing the image according to claim 6, wherein the device for reading the image is configured to generate an image according to the signals output by the device for recognizing the image to recognize the image to be recognized.

* * * * *